June 19, 1951 O. H. SCHMITT 2,557,697

SQUARE WAVE MODULATING ARRANGEMENT

Filed Nov. 27, 1945

INVENTOR.
OTTO H. SCHMITT
BY
William D Hall
ATTORNEY

Patented June 19, 1951

2,557,697

UNITED STATES PATENT OFFICE 2,557,697

SQUARE WAVE MODULATING ARRANGEMENT

Otto H. Schmitt, Mineola, N. Y., assignor to the United States of America as represented by the Secretary of War Application November 27, 1945, Serial No. 631,177

9 Claims. (Cl. 332—67)

This invention relates to keying and modulating systems for radio transmitters. The primary object is to provide a simple, efficient square-wave modulating or keying system.

In applying square-wave modulation methods such as the one disclosed, for example, in the copending application of Donald G. C. Hare and John N. Adkins, Serial No. 604,062, filed July 9, 1945, now abandoned, the modulating or keying device is required to be operable over a wide range of audio frequencies. Moreover, the corners of the square-wave voltage used for keying the power oscillator should be sharp, particularly where grid modulation is employed, to avoid frequency shift at the start and termination of each pulse of operation.

Hence, it is a further object of this invention to provide a square-wave modulator unit which will effectively produce a square-wave transmitter operation over a wide range of modulation frequencies. More broadly, the object is to provide an improved grid-modulating device of general application.

In accomplishing these objects, there is provided a modulating or keying tube in the grid-return circuit of the transmitting tube or tubes to be controlled. Shunting the keying tube are a cutoff bias supply and a voltage-dropping resistance in series, and the postive terminal of this bias supply is returned to the negative power supply terminal of the keyed stage. So long as the keying tube is at its maximum conductivity as determined by its control grid, the voltage-dropping resistance renders the cut-off bias supply ineffectual in relation to the radio-frequency stage; but when the keying tube is at its minimum conductivity, the voltage drop in the series resistance is minimized and the bias supply becomes effective to drive the radio-frequency stage to cutoff.

In a more limited aspect of the invention a secondary driver, operating at a high frequency relative to the keying frequencies and at a frequency widely different from that of the keyed stage, furnishes driving power for the grid of the keying tube. The many significant advantages of this mode of drive will be apparent from the detailed description which follows. In this preferred form of the invention a variable audio-frequency square-wave generator periodically blanks a power oscillator which constitutes the driver. It is important, especially for square waves of high frequency, that this secondary driver commence operation promptly at the end of the blanking interval, and cease promptly at the end of an operating period.

Accordingly, it is a further object to provide an improved arrangement for exciting a periodically blanked driver into operation.

Where a square-wave generator is used as a modulator, it is desirable that it be arranged for variable operating frequency. Additionally the proportion of each cycle during which the transmitter is operative, or its duty cycle, should be adjustable. Therefore, it is another object of this invention to provide a square-wave modulator with an effective duty-cycle control.

Further objects and features of novelty will be apparent from the following detailed description of a generic aspect of the invention and of a preferred detailed embodiment thereof.

Figures 1, 2:
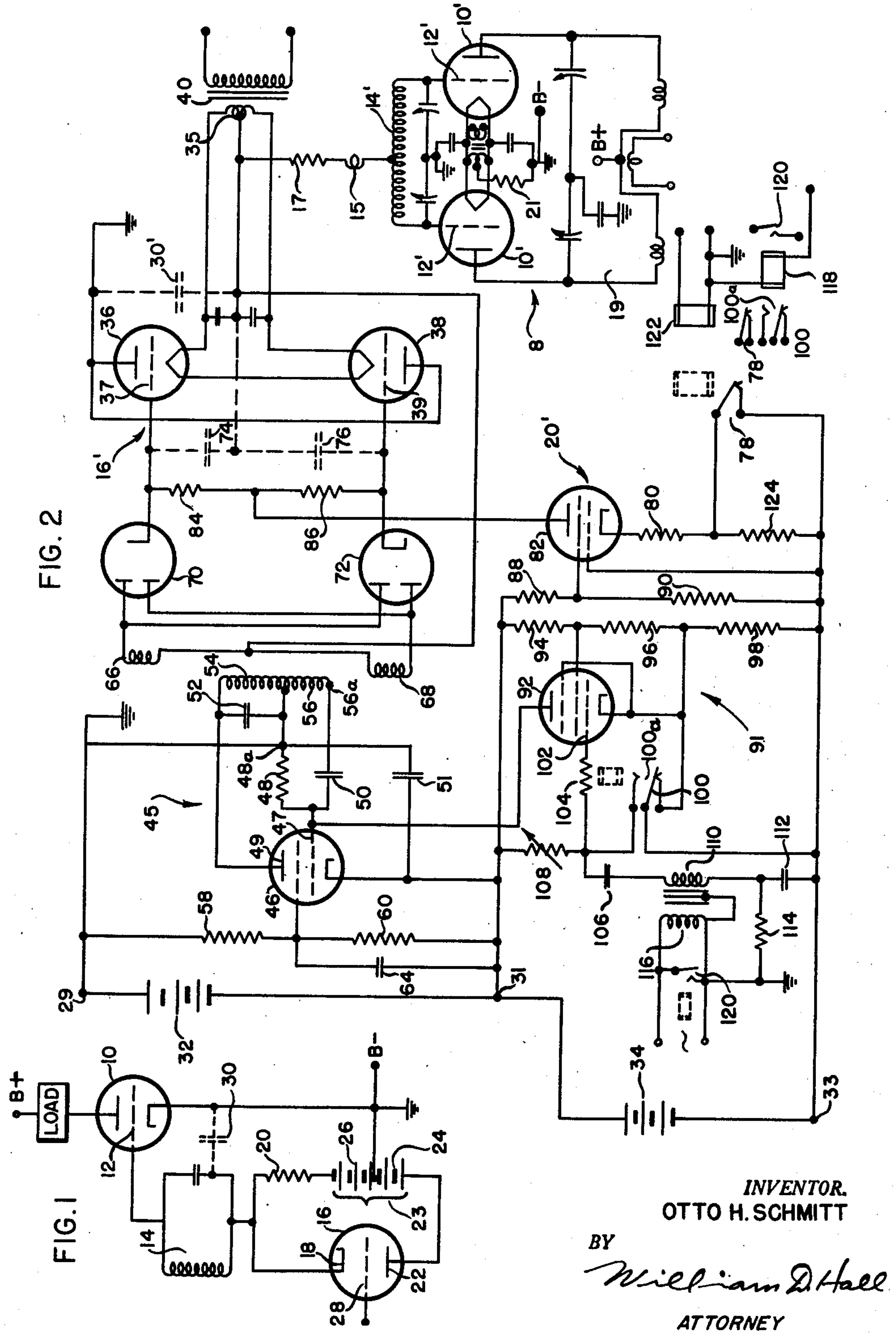
Fig. 1 illustrates one generic aspect of the invention.
Fig. 2 is the detailed wiring diagram of a preferred species of the invention illustrated in Fig. 1, this species embodying ancillary aspects of the invention.

According to the invention illustrated in Fig. 1, a simple, efficient and effective system for square-wave drive of a radio-frequency control-grid is proposed.

Control grid 12 of radio frequency tube 10 has a radio frequency input circuit 14 into which radio-frequency drive is injected. A modulating or keying tube comprising a high plate-conductance triode 16 has its cathode 18 connected to input circuit 14 at the low radio-frequency potential side thereof and also to a terminal of a resistance element 20. Plate 22 of triode 16 is connected to the positive terminal of a voltage source 23 which serves as a bias supply for the radio-frequency stage and a plate power supply for the keying stage while the remaining terminal of element 20 is connected to the negative terminal of that voltage source. The tap between higher section 24 and lower section 26 of voltage source 23 is connected to the cathode of tube 10 and the B— terminal of the radio-frequency stage, to complete the grid-return circuit.

In operation, control grid 28 of modulating triode 16 is driven by some form of square-wave generator (not shown) or in the general case by an electronic or mechanical keying means. When the conductivity of triode 16 is at a minimum, the voltage drop in resistance element 20 is also at a minimum and power supply section 26 is effective to bias tube 10 to cutoff.. However, when the plate-conductance of triode 16 increases, the voltage drop within element 20 increases and the bias on grid 12 is shifted into the operating range.

For high-frequency, sharp-cornered, square-wave operation, the stray capacity of the radio-frequency grid and keying circuits should be abruptly charged and discharged. This stray capacity is indicated in dotted lines and is designated 30. Resistance 20 limits the charging rate and is made as low as is required for good square-wave form at the top modulating frequency. Even with sufficiently low resistance for prompt charging of reasonable stray capacity, the resistance is high enough to constitute only a light load on supply 23. High plate conductance of tube 16 is required for prompt discharge of the stray capacity, as well as for low resistance in the grid-return circuit.

In the case of a high-power radio-frequency stage, the values of operating bias and of cutoff bias likely to be encountered are large. Under such circumstances, positive section 24 of power supply 23 may be omitted and it may be necessary to add resistance in the grid-return circuit. The power dissipated in the plate of the keying tube when most conductive is largely supplied by the grid circuit of the keyed stage.

In Fig. 2 there is shown in the right-hand portion of the drawing a modulated push-pull radio frequency power oscillator 8 in which the elements designated by primed numerals correspond to the similar components in Fig. 1. Radio frequency power tubes 10′ have grids 12′ connected to a tuned circuit including coil 14′. This coil is center-tapped and connected to radio frequency choke 15 which in turn is connected to grid leak resistor 17 and thence to a circuit for developing additional grid bias and for grid modulation, to be described. The plates of tubes 10′ are connected to a resonant tank circuit 19 the coil of which is center-tapped and connected to the positive power supply terminal of stage 8. In the cathode circuit of tubes 10′ there is a protective bias resistor 21. The filament-cathodes are by-passed to ground as is conventional.

Keying tube 16 of Fig. 1 is here replaced by modulating triodes 36 and 38 (generally indicated 16′) the plates of which are connected together and grounded, as is the negative terminal of the power supply (not shown) of oscillator 8. The cathodes of tubes 36 and 38 are energized from filament transformer 40 the center-tap of which is connected to bias resistor 17. So long as tubes 36 and 38 are conducting, they will provide a certain resistance drop which, added to that of resistor 17, will provide proper grid leak bias for triodes 10′. In this circuit there is no need for a counterpart of section 24 of the high-voltage supply 23 in Fig. 1. The current through tubes 36 and 38 is almost exclusively the direct grid-return current of oscillator 8. A comparatively slight current, which flows through the device 20′ (a counterpart of element 20), is also passed by these tubes.

In order to maintain the conductance of tubes 36 and 38 at a maximum, it is desirable that their control grids be driven positive. This is effected by a driver in the form of a reversed feed-back oscillator 45, which is low in power and in frequency compared with oscillator 8. Grid leak 48 and capacitor 50 provide operating bias for tube 46. Plate tank capacitor 52 and coil section 54 with grid feedback coil section 56 are also included in the oscillator. Capacitor 51 is for the purpose of radio-frequency by-pass. The screen grid of tetrode 46 is energized by a voltage divider made up of resistors 58 and 60 spanning a power supply 32, the screen grid being by-passed to negative terminal 31 of supply 32 by means of capacitor 64. Terminal 48*a* of the grid leak 48 is returned to the positive terminal 29 of supply 32. A high positive voltage on terminal 48*a* is desirable, as will appear.

The output of oscillator 45 is delivered from coil 54, 56 through relatively tight coupling to symmetrical sections 66, 68 of a secondary winding. This output is converted to unidirectional power by full-wave rectifiers 70 and 72 and positive voltage is applied to control grids 37 and 39 of the modulating stage 16′. The input capacity 74, 76 shown in dotted lines acts as a filter to sustain the positive grid drive during the pulses of rectifiers 70 and 72. While the plates of tubes 36 and 38 are connected in parallel, the drive circuits for the grids are somewhat isolated. Otherwise one tube might draw a disproportionate grid current and deprive the other of requisite drive. The rectifiers are not essential, for grids 37 and 39 would be effective during half-wave cycles as their own rectifiers. The input capacities 74 and 76 would then be ineffective to extend this cycle. The inclusion of full-wave rectifiers decreases the required peak of the ordinarily heavy grid current of tubes 36 and 38, and makes possible a higher average plate conductance.

The cutoff bias circuit for oscillator 8 may now be traced. Positive terminal 29 of the bias supply is grounded, and is thus connected to the cathode return of oscillator 8. From extreme minus terminal 33 of power supply 32, 34 the circuit extends through relay contacts 78 (the purpose of which will be explained), bias resistor 80, tetrode 82, and then divides symmetrically through resistors 84 and 86, rectifiers 70 and 72 and secondary sections 66 and 68. The bias circuit is connected to cathode center tap 35 and to bias resistor 17 of oscillator 8. The screen-grid of tetrode 82 has a suitable direct-current potential furnished by resistors 88 and 90 between terminals 31 and 33, and its control grid is also connected to terminal 33. It acts as a constant-current counterpart of resistive element 20 in Fig. 1 and is indicated generally by the arrow and numeral 20′. Resistors 84 and 86 and rectifiers 70 and 72 add but slightly to this resistance.

So long as oscillator 45 energizes control grids 37 and 39, cutoff bias supply 32, 34 is ineffective with respect to the control grids of the high-power oscillator. When operation of oscillator 45 is interrupted, the plate conductance of tubes 36 and 38 drops to a very low value, constant-current device 20′ promptly drops in resistance and power supply 32, 34 becomes effective to drive grids 12′ well beyond cutoff. For this to occur it is first necessary to charge stray capacity 30′ to the cutoff voltage. The current that device 20′ will pass is adjusted to a maximum, within economical limits, to allow a high charging rate. This partly determines the sharpness of pulse termination. The stray capacity may be minimized by special design of transformer 40. Prompt pulse termination is also promoted by minimizing the Q of the driver tuned circuit so that its field is quickly depleted of energy. This is effected through a high ratio of inductance to capacity, through loading, etc. The sharpness of commencement of the pulses depends upon prompt, strong drive for grids 37 and 39; for tubes 36 and 38 must abruptly discharge the cutoff bias voltage to which the stray capacity is charged. This positive drive is required for fast action as well as for economical rating requirements for tubes 36 and 38. Where that drive is obtained from an oscillator having grid-leak and capacitor bias means, the oscillator should have a low Q tank circuit, and should be excited into operation. A gradual dissipation of blanking voltage, followed by a slow build-up of the oscillator is not satisfactory. The same principles apply in an amplifier stage having grid-leak and capacitor bias.

The control circuit for oscillator 45, for effecting prompt drive of tubes 36 and 38 after a cutoff interval, will now be described. Control grid 47 of tube 46 is directly connected to the plate of a pentode 92. Bias for tube 92 may be supplied from a voltage divider comprising resistors 94, 96 and 98, the voltage for the screen grid also being supplied from this voltage divider. Bias resistor 98 is normally shorted by relay contacts 100 the purpose of which will be explained hereinafter. Control grid 102 has a current-limiting resistor 104 and is coupled to an input circuit by capacitor 106. The junction of resistor 104 and capacitor 106 is connected to adjustable resistor 108 the opposite terminal of which is connected to positive terminal 31 of power supply section 34. The aforementioned input circuit comprises secondary winding 110 of a small, wide-frequency range, high step-up ratio, audio-frequency transformer one end of which is connected to capacitor 106. The other secondary terminal is returned to negative terminal 33 of source 34 through blocking capacitor 112. Resistor 114 is connected between ground and the junction of capacitor 112 with secondary winding 110. Primary winding 116 of the audio transformer is grounded at one terminal and is arranged for drive by an adjustable-frequency, sine-wave generator (not shown). Large resistor 114 is to fix and minimize the direct current (average) drop from primary 116 to secondary 110 which, but for capacitors 106 and 112, would be in a circuit strongly negative with respect to ground. The leakage resistance of the transformer might be high compared with the capacitor leakage resistance, and in the absence of resistor 114 the transformer insulation would be required to withstand an undesirably high voltage.

While there is no signal voltage at primary 116, grid 102 is positive with respect to cathode and pentode 92 has a minimum value of resistance. Consequently, a large proportion of the voltage between terminals 29 and 33 appears across resistor 48. The voltage of control grid 47 is dropped well below terminal 31 and oscillator 45 is cut off.

With sufficient negative drive delivered by secondary 110, tube 92 is suddenly cut off and control grid 47 is permitted to rise quickly toward the positive potential of terminal 29. The rate of rise is limited only by the rate of discharge of capacitor 50 through resistor 48, and discharging continues until the oscillator grid approaches zero negative bias. The direct current bias ceases to become more positive as the oscillator is excited into operation, but until capacitor 50 (serving now as the normal grid leak capacitor of an oscillator) can recharge, oscillation continues to increase in amplitude and almost instantly exceeds the steady-state amplitude as it momentarily is working at much less than its normal bias. This momentary intensification of oscillation is utilized to compensate for the slight lag in establishing "on" operation in the rest of the system, the lag being due to the stray capacities and filters of the system. As normal grid-leak bias is established, the direct potential at the grid again recedes in a negative direction and a steady-state condition is established.

The return of grid resistor 48 to a high positive point in the power supply does not change the usual manner of operation of the grid-leak and capacitor in furnishing grid bias. The grid resistor 48 has a value equal to the plate voltage plus the grid bias divided by the allowable grid current. The value of the capacitor 50 is computed from the allowable time constant. It should be noted in the present circuit that the grid potential reaches its operating value rapidly after having been cut off, compared with the time it would take were terminal 48*a* returned to cathode or a negative potential as is conventional. If the voltage of point 48*a* is 700 v. with respect to the cathode of tube 46 and if the cutoff bias of tube 46 is −50 v. in the present circuit, it takes a certain short time for capacitor 50 to discharge from −800 v. with respect to ground, for example, to −750 v. at which time operating bias is reached. This time is less than it would take for the grid-bias capacitor in the conventional circuit to discharge from −100 v. to the operating bias of −50 v. The −800 v. and −100 v. figures represent equal degrees of blanking drive of the grid, with the grid resistor connected to B+ in the first instance and connected to cathode in the latter. The positive voltage on grid-leak terminal 48*a* is effective to excite the stage into operation after it has been cut off by high bias. Thereafter there is prompt build-up of the oscillations to a maximum provided that the oscillator tank circuit is low in Q. The high resistance of resistor 48 made possible by the present circuit has the further advantage of providing the high impedance desirable as the load of modulator pentode 92.

It has earlier been stated that there is provided a variable duty-cycle control. By properly proportioning resistors 104 and 108 and capacitor 106, a desired duty cycle may be attained which is only slightly affected by variations in sine-wave drive frequency. By making resistor 108 variable as indicated, the duty cycle may be varied. A high-voltage sine-wave drive is impressed on the circuit of grid 102. If the grid bias were equal to the peak value of that drive plus cutoff bias (a condition that cannot quite exist here) there would be zero plate current in tube 92 and there would be a 100 per cent duty cycle. If there were positive voltage applied to the grid circuit equal to the peak value of the drive minus cutoff bias for the tube, there would be a zero per cent duty cycle. This condition is possible but not used. Between the two extremes the tube operates between cutoff and saturation during a sine-wave cycle, and yields a substantially square wave. The duty cycle is determined by the bias developed by resistors 104 and 108 and capacitor 106.

Capacitor 106 draws a charging current through resistor 104 during portions of the cycle when grid 102 has a positive voltage (relative to cathode) impressed on it by winding 110. This current also charges large capacitor 112 slightly. The charge is gradually dissipated through resistor 108 and power supply section 34. The duty cycle depends both on the charging and discharging time constants, for the average grid bias determines how far up on the input sine-wave tube 92 is operating.

The circuit of Fig. 2 so far described includes a square-wave modulator 91 of variable frequency and variable duty cycle which is arranged to alternately operate and cut off the oscillator 45, Through high-frequency transformer 54, 56, 66, 68 and the full-wave rectifier circuits, keying tubes 36 and 38, and correspondingly oscillator 8, are rendered alternately conducting, to effect pulse transmission, and then largely nonconducting. It is desirable that provision be made for sustained carrier transmission and also for sustained blocking of the transmitter. It will be observed that the transmitter may be in operation only so long as pentode 92 is nonconducting. By providing a relay 118, the control circuit for which is not shown, the sine-wave input may be shorted out by contacts 120. In this condition, grid 102 is somewhat positive, pentode 92 is conducting and operation of oscillator 8 is suppressed. By means of another relay 122 the control circuit for which is not shown, contacts 100 may be opened and contacts 100*a* closed. This impresses cutoff bias on pentode 92 and oscillator 8 is rendered continuously operative. Relay 122 is also arranged to open contacts 78 which are noramlly arranged to short-circuit bias resistor 124 of tetrode 82. This tube is thus shifted to lower-current operation to avoid unnecessary drain on power supply 32, 34 and unnecessary tube heating.

It will be seen that there is provided in Fig. 2 a flexible and effective square-wave modulator and control circuit for a power oscillator or similar high-frequency stage. It will operate in a grid circuit where no appreciable grid-leak bias is required just as with oscillator 8 which includes a grid-leak bias resistor. For good square-wave operation, it is necessary that the frequency of oscillator 45 be high relative to the highest drive frequencies to be impressed by driver 91 and the frequencies of oscillators 45 and 8 should be widely different from each other. In one example, driver 91 was arranged to provide square-waves of from 50 cycles to 30 kilocycles per second, oscillator 45 was operated at approximately 3 megacycles and oscillator 8 was operated in excess of 50 megacycles. In this arrangement certain other constants might be of interest as an aid to more complete understanding of its operation.

Tubes 36, 38, type 811
Tubes 46, 82, type 807
Tube 70, type 6x5GT (two in parallel)
Tube 72, type 6x5GT (two in parallel)
Tube 92, type 6SJ7GT
Resistor 48, 133,000 ohms
Resistors 58, 94, 96, 25,000 ohms
Resistor 60, 10,000 ohms
Resistor 80, 1,000 ohms
Resistors 84, 86, 500 ohms
Resistor 98, 20,00 ohms
Resistor 104, .5 megohm
Resistor 108, 5 megohms (variable)
Resistor 114, 1 megohm
Capacity 30', 150 micromicrofarads
Capacitors 50, 52, 50 micromicrofarads
Capacitor 51, .01 microfarad
Capacitor 64, 250 micromicrofarads
Capacitor 106, .02 microfarad
Capacitor 112, 1 microfarad
Sine-wave voltage 110, 100 v. rms
Voltage power supply 32, 700 v.
Voltage power supply 34, 400 v.
Plate current tetrode 46, 27 milliamperes (50% duty cycle; approx.)
Cathode current tetrode 82, 18 milliamperes (50% duty cycle; approx.)
Plate current pentode 92, 3.5 milliamperes (50% duty cycle; approx.)

Plate current 36, 38 (each), up to 200 milliamperes (average) (50% duty cycle; approx.)
Grid current 37, 39 (each), 50–70 milliamperes (50% duty cycle; approx.)
Total power consumption (excluding oscillator 8), 185 watts (50% duty cycle; approx.)
Power, oscillator 8, 3 kilowatts (50% duty cycle; approx.)

Were it not for the use of the modulated high-frequency driver for grids 37 and 39, they would otherwise be driven from a relatively high-power amplified, either choke or transformer-coupled. All such circuits introduce extreme difficulties in design for the wide latitude of frequency response required. Thus for square-waves of from 50 cycles to 30 kilocycles, the frequency response of the coupling should extend up to at least 150 kilocycles. Furthermore, such couplings involve exacting tube and insulation requirements. Grids 37 and 39 may fluctuate from a few hundred volts above ground to a thousand or more volts negative with respect to ground and the entire modulator would, but for the present arrangement, be required to swing through that voltage range. The use of a modulated signal for driving grids 37, 39 accomplishes a large transfer of energy from a tube fixed in potential relative to ground to tubes the grids and cathodes of which vary widely with respect to ground without capacitive loading of the output circuit. This avoids high keying-frequency difficulties without resort to special, expensive and ponderous components. These advantages specifically mentioned and others, which will be apparent from a study of the device, characterize this arrangement as a square-wave modulator or keying device, especially for high modulation frequencies. It will be at once apparent that the modifications and substitutions that are possible are too numerous to mention.

In conclusion, it will be understood that, while the foregoing detailed description represents a preferred embodiment of the invention a generic aspect of which is shown in Fig. 1, changes in the construction and arrangement of parts may occur to those skilled in the art without departing from the spirit and scope of the invention as defined in the appended claims.

What is claimed is:

1. In a square-wave modulator for a radio-frequency amplifier which includes at least one control grid, a cathode, a direct current power supply and a cathode-return circuit to the negative terminal of said supply, the combination of a cutoff bias supply and a resistance element in series therewith in a circuit between said grid and the cathode-return circuit, and a circuit shunting by direct current connections said resistance element and cutoff bias supply, said shunt circuit including at least one electron tube having an input grid and means for applying a control signal to said input grid alternately to render said tube in said shunt circuit non-conductive and conductive whereby said bias supply can be rendered alternately effective and ineffective to drive said amplifier to cutoff depending on the voltage drop across said resistance element as determined by the condition of said tube.

2. The apparatus according to claim 1 in which the conductivity of said tube is varied between extreme limits by means of a square-wave modulated carrier-freqency generator coupled to the control grid of said shunting tube.

3. In a radio-frequency device including a tube having at least one control element, a resistor, a bias supply, said resistor being connected in series with a portion of said bias supply in the return circuit of said control element, a modulator tube directly connected in series with another portion of said bias supply and across the series combination of said resistor and said first-named portion, said modulator tube including a cathode, an anode and a control grid and being arranged with its cathode electrically closer than its anode to the control element of said first-named tube, and means coupled to said control grid for varying the conductivity of said modulator tube.

4. A square-wave modulated amplifier comprising an electron tube having a control grid, an anode, a cathode, and a direct current power supply, a grid bias resistor connected between said grid and a high-potential point of said supply with respect to said cathode, a capacitor and a high-frequency supply device connected in series, the series-connected components being connected in shunt with said resistor, said resistor-capacitor combination having a time-constant appropriate for developing grid bias, and cutoff bias supply means between said grid and said cathode which is arranged to be alternately effective and ineffective to drive said amplifier to cutoff.

5. A square-wave generator comprising an electron tube having an anode, a cathode and a control grid, a direct-current circuit including a coupling between said control grid and a point of positive direct current potential relative to said cathode, said circuit including an adjustable duty-cycle control resistor, a circuit shunting said direct-current circuit including a capacitor and sine-wave voltage supply means, the time constant of said capacitor and said resistor being such that an adjustable negative bias may be developed on said control grid.

6. A radio frequency translating device including a tube having at least one control element and a plate and a cathode, an output circuit coupled between said cathode and plate, a signal input circuit connected between said control element and said cathode, a cutoff bias supply and a resistor connected in series between said control element and cathode, a modulator tube directly connected across said series-connected resistor and bias supply, said modulator tube including a cathode and an anode and a control grid and being arranged with its cathode electrically closer than its anode to the control element of said first-named tube, and means coupled to said control grid for alternately rendering said modulator tube conductive and non-conductive and thereby alternately rendering said bias supply ineffective and effective to cutoff said first-named tube.

7. A translating device according to claim 6, in which said means for alternately rendering said modulator tube conductive and non-conductive comprises a pulsed oscillator arranged to produce pulse-modulated waves of a frequency different from the frequency of operation of said first-named tube.

8. A translating device according to claim 7 further including a rectifier connected to said pulsed oscillator for rectifying said pulse-modulated waves and means connected between said rectifier and the grid of said modulator tube for applying said rectified waves to the grid of said modulator tube.

9. A translating device according to claim 7, in which said pulsed oscillator comprises a first tube having a cathode and at least one control grid and a plate, an oscillator tank circuit coupled between said grid and plate, a direct current power supply connected between said cathode and plate, a grid bias resistor connected between said grid and a positive potential point on said supply with respect to said cathode, a capacitor connected in shunt across said resistor, said resistor-capacitor combination having a time-constant appropriate for developing grid bias, and cutoff supply means connected between said grid and said cathode and arranged to be alternately effective and ineffective to drive said oscillator to cutoff.

OTTO H. SCHMITT.

REFERENCES CITED

The following references are of record in the file of this patent:

UNITED STATES PATENTS

| Number | Name | Date |
|---|---|---|
| 2,274,829 | Goddard | Mar. 3, 1942 |
| 2,338,512 | Harmon | Jan. 4, 1944 |
| 2,392,114 | Bartelink | Jan. 1, 1946 |
| 2,403,549 | Poch | July 9, 1946 |